United States Patent [19]

Borcea et al.

[11] Patent Number: 5,529,359
[45] Date of Patent: Jun. 25, 1996

[54] CRIPPER ASSEMBLY WITH IMPROVED SYNCHRONOUS TRANSMISSION

[76] Inventors: Nicky Borcea, 95 Steep Hill Rd.; Alexandru D. Ionescu, 78 Catbrier Rd., both of Weston, Conn. 06883

[21] Appl. No.: 231,242

[22] Filed: Apr. 22, 1994

[51] Int. Cl.⁶ ..................................................... B25J 15/08
[52] U.S. Cl. ........................... 294/88; 294/119.1; 901/37
[58] Field of Search ..................................... 294/88, 119.1; 269/25; 279/110; 384/50, 51, 55; 901/31, 36, 37, 39

[56] References Cited

U.S. PATENT DOCUMENTS

| | | | |
|---|---|---|---|
| 4,305,692 | 12/1981 | Brauer | 294/119.1 X |
| 4,611,846 | 9/1986 | Feiber et al. | 294/119.1 X |
| 4,741,568 | 5/1988 | Borcea et al. | 294/88 |
| 4,865,375 | 9/1989 | Laub et al. | 294/119.1 X |
| 4,874,194 | 10/1989 | Borcea et al. | 294/88 |
| 5,125,708 | 6/1992 | Borcea et al. | 294/88 |
| 5,163,729 | 11/1992 | Borcea et al. | 294/119.1 |

FOREIGN PATENT DOCUMENTS

| | | | |
|---|---|---|---|
| 3521821 | 1/1987 | Germany | 294/119.1 |

*Primary Examiner*—Johnny D. Cherry
*Attorney, Agent, or Firm*—Fattibene and Fattibene; Arthur T. Fattibene; Paul A. Fattibene

[57] ABSTRACT

A gripper assembly having a unitary housing with a cylinder bore and a pair of pistons slidably disposed within the cylinder bore and having a finger carrier connected to each of the pistons whereby the displacement of the pistons in one form of the invention may effect either a synchronous displacement of the finger carriers between a protracted and retracted position and which, in a slightly modified form, may effect a non-synchronous displacement of the finger carriers. In either form, the respective finger carriers are slidably supported on a trackway formed integral of the housing.

12 Claims, 4 Drawing Sheets

CRIPPER ASSEMBLY WITH IMPROVED SYNCHRONOUS TRANSMISSION

FIELD OF INVENTION

This invention relates to a gripper device for use on robotic machines for gripping, transporting, and/or placing of machine parts in an accurate and positive manner having an improved transmission for effecting either synchronous or non-synchronous movement of the gripping fingers between a retracted (closed) position and a protracted (open) position.

PRIOR ART

A number of mechanical grippers for use with robotic machines are well known. Such known mechanical grippers are disclosed in our own prior patents as well as those of others. For example, reference is made to our prior U.S. Pat. Nos. 4,741,568; 4,874,194; 5,125,708; and 5,163,729, and the various patents cited therein. Generally, such grippers are comprised of intricate, highly machined parts that render the assembly expensive and difficult to manufacture.

Therefore, an object of this invention is to provide a relatively simple and inexpensively constructed gripper assembly having a minimum of lost motion between the moving components so as to be rendered capable of achieving the accuracy of the more complex gripper assemblies.

Another object is to provide a gripper assembly with an improved synchronization of motion to the gripping fingers between the retracted and protracted positions thereof.

Another object is to provide a gripper assembly with improved synchronization mechanism that is efficient, simple in design and having a minimum of lost power of the usable gripping force.

SUMMARY OF THE INVENTION

The foregoing objects and other features and advantages are attained by a gripper assembly that is formed of a unitary housing having a cylinder bore extending therethrough which is sealed by opposed end closures. A pair of pistons are slidably disposed within the cylinder bore, which are actuated by a fluid pressure. The housing is provided with opposed extensions disposed to one side of the cylinder bore to define a channel for supporting a pair of finger carriers slidably mounted for movement between a retracted and protracted position. According to this invention, the piston displacement movement is transmitted to the finger carriers by a pin connection to effect corresponding movement of the respective finger carriers in either a synchronous or non-synchronous manner between a retracted and protracted position with a minimum of lost motion. In another form of the invention, the displacement movement of the piston through a connecting pin is transmitted to the finger carriers which are synchronized by a gear and rack arrangement operatively interconnected between the piston pins. The respective finger carriers are slidably mounted within the channel defined by the housing extensions on a bearing and track arrangement disposed between the housing extension and finger carriers whereby the housing extension and finger carriers are provided with complementary grooves for supporting the track member therebetween.

IN THE DRAWINGS

DETAILED DESCRIPTION

Figure 1:
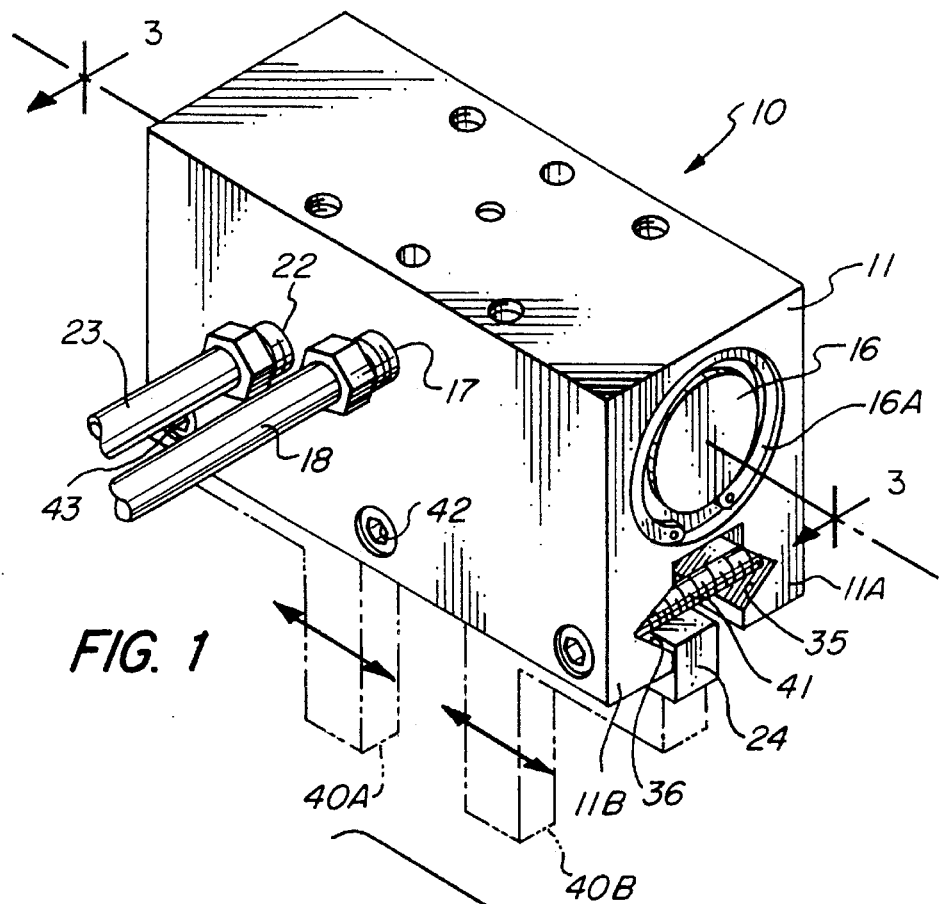
FIG. 1 is a perspective view of a gripper assembly embodying the invention.
Figure 6:
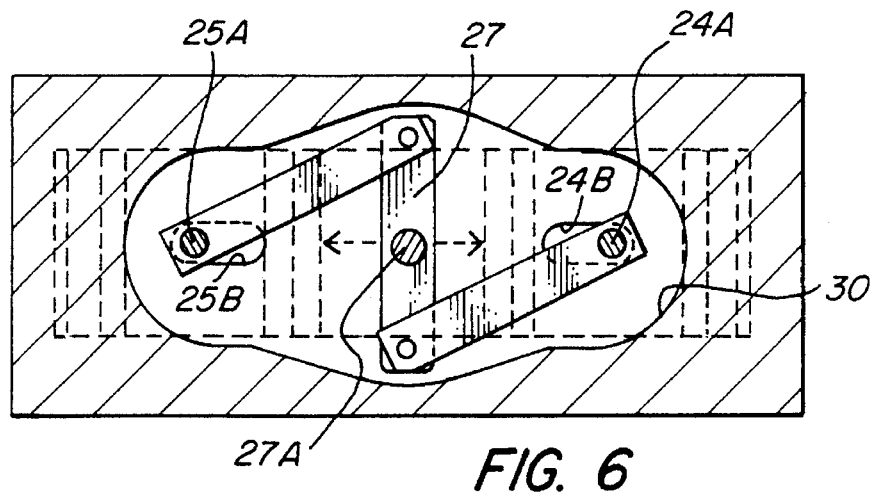
FIG. 6 is a sectional view taken along line 6—6 on FIG. 4 illustrating the component parts in the protracted or open position.
Figure 7:
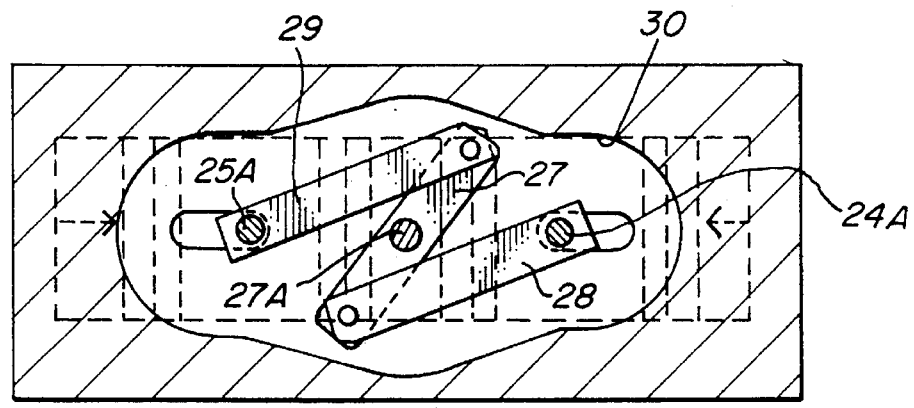
FIG. 7 is a sectional view similar to that of FIG. 6, but illustrating the component parts in a retracted or closed position.

Referring to the drawings, there is shown in FIG. 1 a perspective view of a gripper assembly 10 embodying the present invention. Gripper assembly 10, as disclosed herein, is used in conjunction with robotic type machines for gripping, transporting and/or placing various machine or component parts in an accurate and precise manner as may be required in various assembly operations. The gripper assembly 10 includes a housing 11 having a cylinder bore 12 extending therethrough. Slidably disposed within the cylinder bore 12 are a pair of pistons 13 and 14, each having adjacent the respective ends thereof sealing rings 13A, 13A and 14A, 14A. The opposed ends of the cylinder bore are sealed by end closures 15 and 16 which are secured in place by a retaining ring 15A and 16A. Spacing the respective end closures 15 and 16 from the end of the cylinder bore 12 is a seal 15B and 16B respectively. In the arrangement described, the pistons 13 and 14 are displaceable between a protracted and retracted position as shown in FIGS. 6 and 7.

Figure 3:
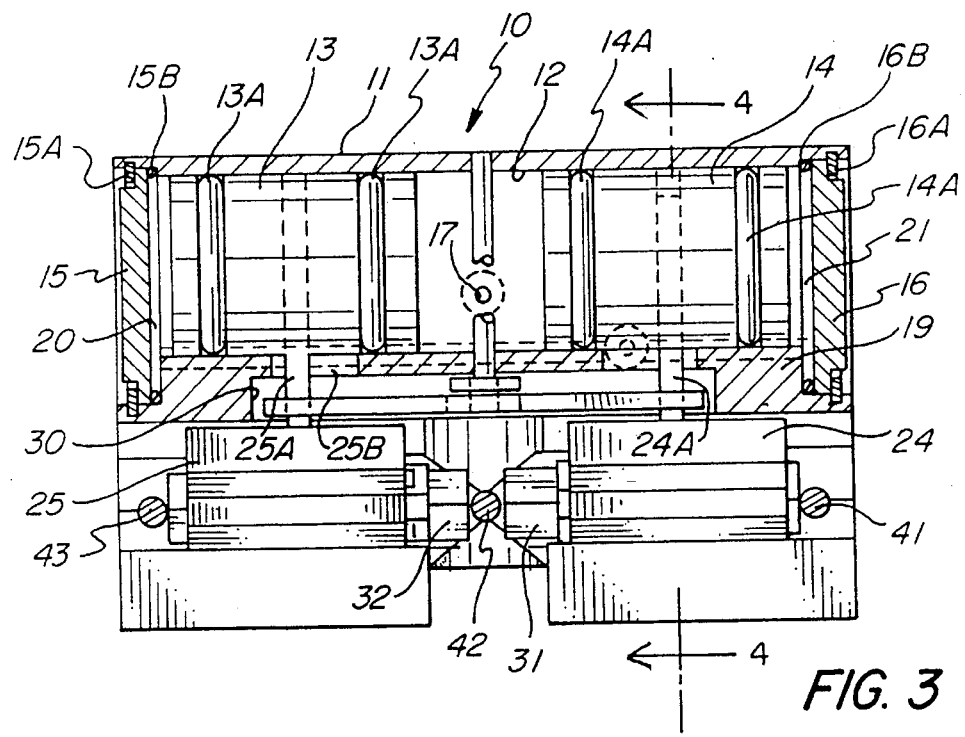
FIG. 3 is a section view taken along line 3—3 on FIG. 1.

Displacement of the pistons 13 and 14 is effected by fluid pressure, e.g. compressed air or hydraulic fluid. To effect controlled displacement of the pistons in one direction, a means 17 is provided for introducing a fluid pressure into the cylinder bore 12 at a point between the adjacent ends of the respective pistons 13 and 14. The fluid inlet means 17 comprises a bore to which a suitable fluid pressure supply conduit 18 may be detachably connected. To effect displacement of the pistons 13 and 14 in the opposite direction, a means is provided for introducing a fluid pressure at the remote ends of the respective piston as noted in FIG. 3. This is attained by providing the housing 11 with a longitudinally extending bore 19 which communicates with the spaces 20 and 21 defined adjacent the end closures 15 and 16 by the gaskets 15B and 16B respectively, as best seen in FIG. 3. Disposed in communication with the bore 19 is a fluid inlet 22 to which a supply conduit 23 is detachably connected for controlling the flow of a pressure actuating fluid to and from the bore 19. It will be understood that supply conduits 113 and 23 are connected to a suitable source of a pressure actuating fluid. The respective supply conduits 18 and 23 are disposed in circuit with suitable valves and control means for controlling the fluid pressure to and from the cylinder bore so as to control the displacement of the pistons 13 and 14 and the associated finger carriers 24 and 25 as will be hereinafter described..

Referring to FIG. 1, the housing 11 is provided with a pair of opposed extensions 11A and lib projecting to one side of the cylinder bore 12 to define a channel therebetween for receiving the finger carriers 24 and 25. In accordance with this invention, the finger carriers 24 and 25 are connected to corresponding pistons 14 and 13 respectively by a connecting pin 24A and 25A. Pins 24A and 25A extend from the respective pistons 14 and 13, through a slotted hole 24B and 25B formed in the roof 26A of the channel 26. It will thus be apparent that the displacement of the pistons will effect displacement of the finger carriers 24 and 25.

Figure 2:
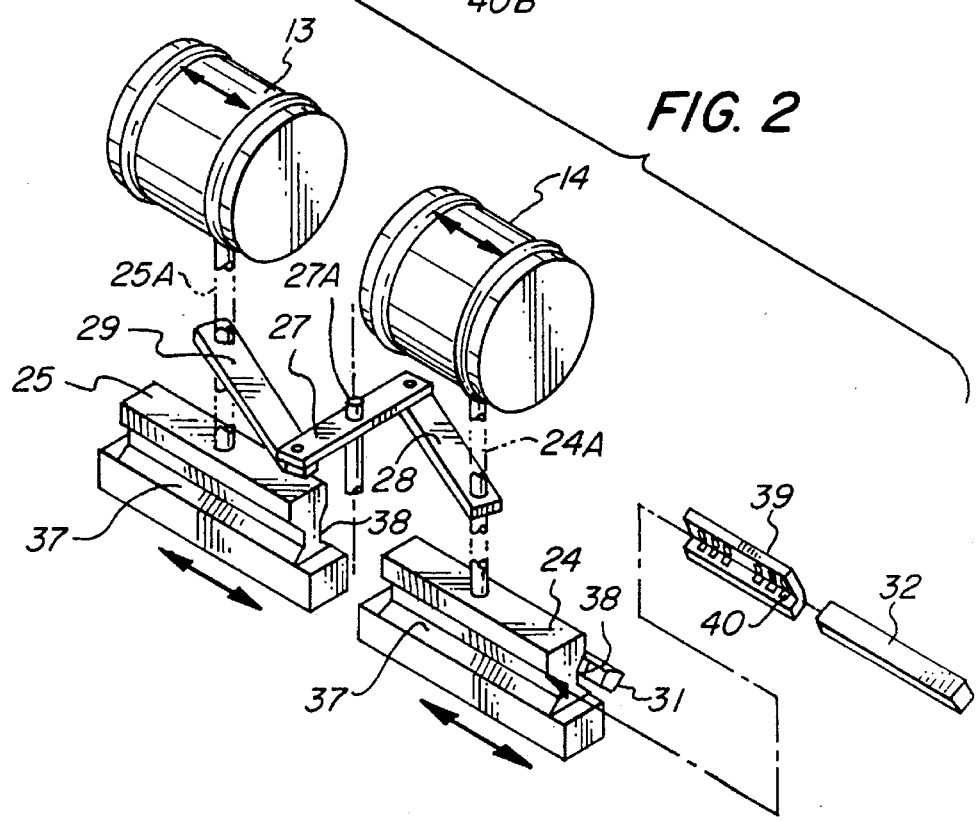
FIG. 2 is a fragmentary exploded view illustrating the interconnection between the pistons and the finger carriers for effecting the synchronous movement of the finger carriers.

To insure a synchronous displacement of the respective finger carriers 24 and 25, a synchronization means is interconnected between the pistons 13, 14 and the corresponding finger carriers 25 and 24. As best seen in FIG. 2, the synchronization means include a cross link 27 pivotally connected by a pivot pin 27A to the roof 26A of the channel 26. Pivotally interconnected between the opposed ends of the cross link 27 and the corresponding pins 24A and 25A are a pair of transfer links 28 and 29. The synchronization means described are housed in a recess 30 formed in the roof 26A of the channel 26. From the foregoing arrangement, it will be noted that as the pistons 13 and 14 are displaced between a protracted and retracted position, the corresponding finger carriers 24, 25 are provided with a synchronous movement as a result of the described synchronization linkage means.

The respective finger carriers 24, 25 are slidably supported between the housing extension 11A and 11B by means of opposed track members 31, 32 and associated roller bearing means 33, 34. As shown in FIG. 1, the inner surface of the respective housing extensions. 11A, 11B are provided with a V-shaped groove 35, 36 extending longitudinally thereof. The respective finger carriers are likewise provided with a complementary groove 37, 38 on opposite sides thereof. The respective roller bearing means 33, 34 include an angular bearing cage 39 having retained therein a plurality of roller bearings 40. The respective bearing means 33, 34 are disposed on opposite sides of the respective finger carriers 24, 25 whereby the carriers are in rolling engagement with the opposed track members 31, 32 by means of the respective bearing means.

As shown in FIG. 1, suitable gripping fingers 40A and 40B are connected to the respective finger carriers 24, 25 which function to engage the workpiece as the finger carriers 24, 25 are displaced toward the closed or retracted position.

From the foregoing, it will be noted that the housing 11 is formed of a unitary member in which the cylinder bore 12 and channel 26 can be readily machined or formed of an extruded part simply and quickly. The fluid ports 17, 22 and passage 19 can be readily formed in the housing by a simple boring operation. The respective pistons 13 and 14 can be readily installed within the cylinder bore simply and quickly. The finger carriers 24, 25 and associated track means 31, 32 and bearing means 33, 34 are self supported within the channel 26 in the assembled position. The links of the synchronization means may comprise stampings which can be readily pivoted together and quickly assembled. Threaded screws or pins 41, 42 and 43 extending transversely between the housing extension 11A, lib are provided to maintain the respective track members 31, 32 fixed against longitudinal movement relative to said housing extension 11A, 11B, and to prevent deflection under load. If any deflection or play develops, the screws 41, 42, and 43 can provide adjustment to eliminate any play.

Figure 8:
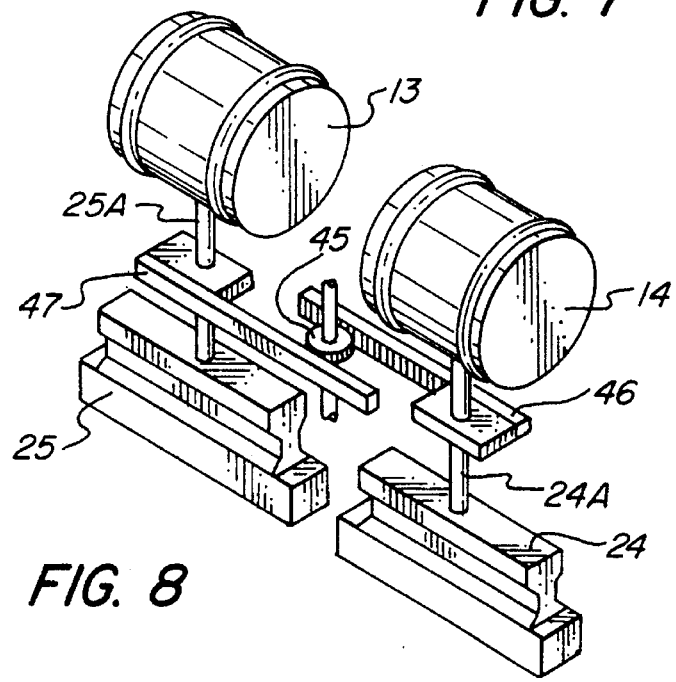
FIG. 8 is a fragmentary perspective view of a modified form of the invention.

FIG. 8 is directed to a gripper assembly similar to that herein described except for a modified synchronization means to effect the synchronous displacement of the finger carriers 24 and 25. In this form of the invention, the synchronization means includes a gear wheel 45 rotatably journalled to the roof 26A of the channel 26 defined by the housing extensions 11A, 11B. A pair of rack members 46, 47 are disposed in meshing relationship with the gear wheel 45 on opposite sides thereof. Rack member 46 is connected to the connecting pin 24A interconnecting piston 14 to finger carrier 24. Rack member 47 is connected to pin 25A connecting piston 13 to finger carrier 25. With the described rack synchronization means of FIG. 8, it will be apparent that the displacement of the pistons 13, 14 as hereinbefore described will effect a synchronous displacement of the respective finger carriers 24, 25 between a protracted (open) position and a retracted (closed) position of the fingers 40A and 40B carried on the respective finger carriers 24, 25. In all other respects, it will be understood that components of the gripper assembly not illustrated in FIG. 8 are similar in all respects to those described with respect to FIGS. 1 to 4.

Figure 4:
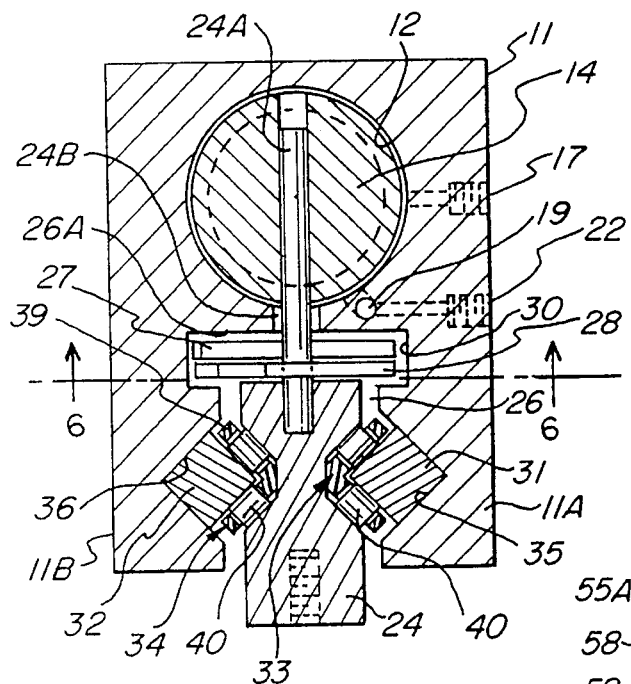
FIG. 4 is a section end view taken along line 4—4 on FIG. 3.
Figure 5:
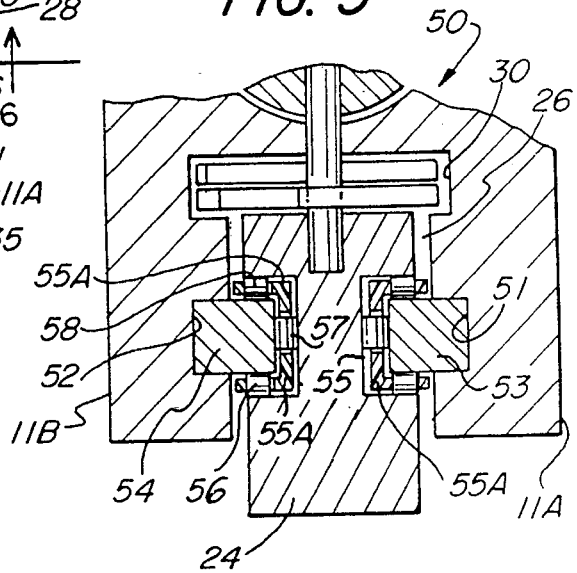
FIG. 5 is a fragmentary end view similar to that of FIG. 4, but illustrating a modified form of a track and bearing assembly.

FIG. 5 illustrates a fragmentary gripper assembly 50 similar to that described with respect to FIGS. 1 to 4, except for a modified track and bearing arrangement for supporting the finger carriers 24, 25 within the channel 26 defined by the housing extensions 11A, 11B. In the form of the invention of FIG. 5, the inner side of the extension 11A, 11B is provided with a square or regular C-shaped groove 51, 52 respectively that extends longitudinally of the housing extensions. Supported within the opposed grooves 51 and 52 is a rectangularly shaped track member 53, 54 respectively. The respective finger carriers 24, 25 are provided on opposed sides thereof with complementary grooves 55 sized for receiving the respective track members 53, 54 and an associated bearing means.

In this form of the invention, the bearing means include a C-shaped cage 55A arranged to extend along the side and the upper and lower surfaces of the associated track member. Retained in the respective walls of the C-shaped cage 55A are a plurality of longitudinally spaced roller bearings 56, 57 and 58. In this arrangement, the finger carrier is disposed in rolling engagement with the associated track member in both the vertical and lateral direction for enhanced stability.

In all other respects, the construction and operation of the gripper assembly 50 is similar to that described with respect to FIGS. 1 to 4.

In each of the described embodiments, each finger carrier 24, 25 is supported on a pair of opposed track members which are fixed against longitudinal movement relative to the housing extensions by the transverse pins or screws 41, 42 and 43.

It will be understood that the bearing arrangements as described with respect to FIGS. 4 and 5 can be utilized in a gripper assembly incorporating the synchronization means of either FIGS. 2 or 8.

Figure 9:
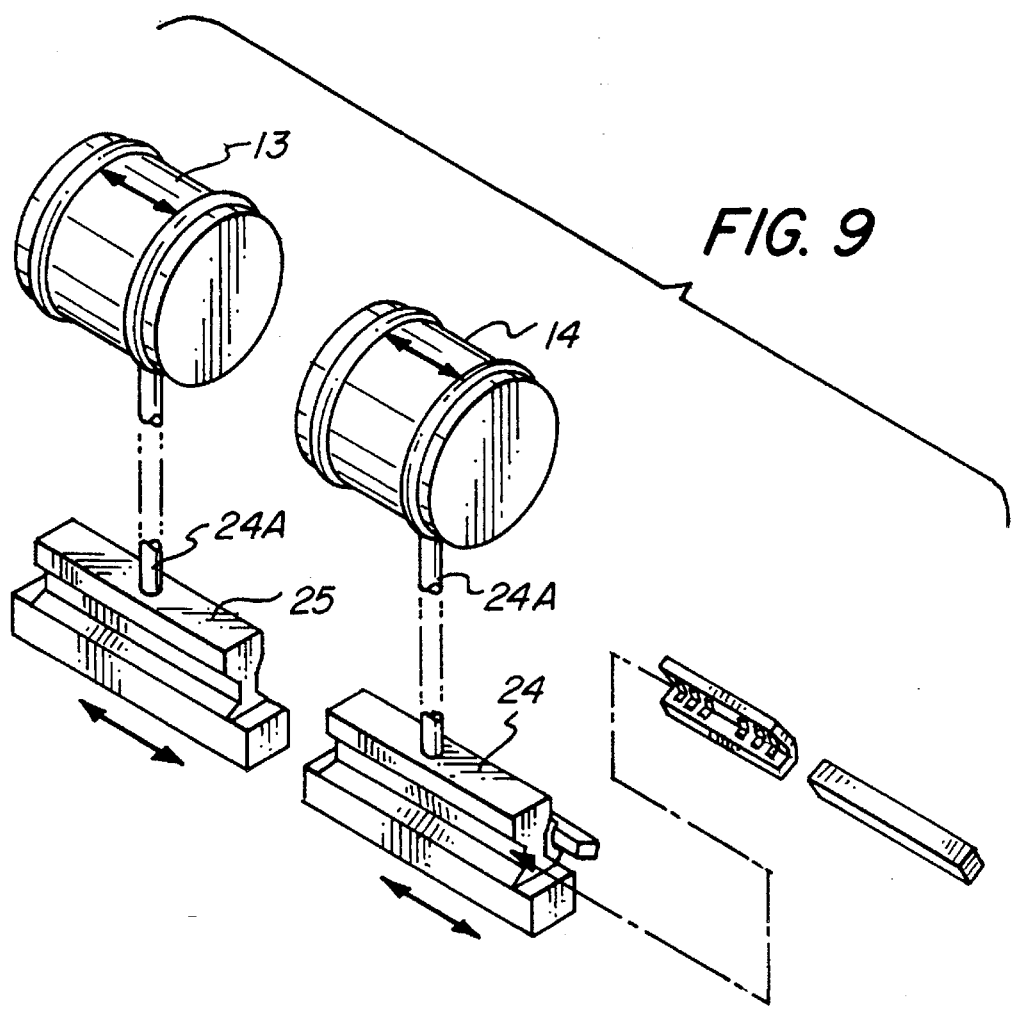
FIG. 9 is a fragmentary exploded view similar to that of FIG. 2 modified to provide non-synchronous movement of the finger carriers.

FIG. 9 illustrates a modified version of the assembly described with respect to FIGS. 1 to 4. In this form of the invention, the synchronous linkage means has been omitted. It will be noted that the pistons are directly connected by pins 24A directly to the respective finger carriers 24 and 25. In this form, it will be noted that the displacement of the respective pistons 13, 14 is transmitted to the corresponding finger carriers 24, 25, whereby the displacement of the finger carriers corresponds to the movement of the respective pistons. Thus, if the pistons are displaced in a non-synchronous manner, a corresponding non-synchronous displacement is transmitted to the associated finger carrier. In all other respects, the gripper arrangement of FIG. 9 is similar to the gripper arrangement of FIGS. 1 to 4 herein described.

While the invention has been described with respect to particular embodiments thereof, it will be understood and appreciated that variations and modifications may be made without departing from the spirit or scope of the invention.

What is claimed is:

1. A gripper assembly comprising a housing having a cylinder bore formed therein, a pair of oppositely disposed pistons slidably disposed within said housing for movement between a retracted and protracted position, opposed track means extending longitudinally of said housing and disposed parallel to said cylinder bore, a pair of oppositely moving finger carriers disposed between said opposed track means, means for connecting each of said pistons to a corresponding finger carrier, said connecting means including a piston pin connection each of said pistons to a corresponding finger carrier, a bearing means disposed between said finger carriers and associated track means for slidably mounting said finger carriers on said track means, and means for introducing a fluid medium into said cylinder bore for actuating said pistons between a retracted and protracted position, and means for synchronizing the movement of said finger carriers to the displacement of said pistons, said synchronizing means including a cross link pivotally mounted on said housing, and a transfer link interconnected between the opposed ends of said cross link and each of said piston pins whereby the displacement of said respective pistons effects synchronous displacement of said finger carriers.

2. A gripper assembly as defined in claim 1 wherein said bearing means comprises:

a bearing cage and a plurality of bearings longitudinally spaced in said bearing cage, said bearing cage and bearings being disposed in rolling engagement with said finger carriers and associated track means.

3. A gripper assembly as defined in claim 2 wherein said opposed track means comprises:

a pair of opposed track members disposed between said housing and said finger carriers, and said bearing means being disposed between each said track member and associated finger carrier.

4. A gripper assembly comprising a housing having a cylinder bore formed therein, a pair of oppositely disposed pistons slidably disposed within said housing for movement between a retracted and protracted position, opposed track means extending longitudinally of said housing and disposed parallel to said cylinder bore, a pair of oppositely moving finger carriers disposed between said opposed track means, means for connecting each of said pistons to a corresponding finger carrier, a bearing means disposed between said finger carriers and associated track means for slidably mounting said finger carriers on said track means, and means for introducing a fluid medium into said cylinder bore for actuating said pistons between a retracted and protracted position, and means for synchronizing the movement of said finger carriers to the displacement of said pistons, wherein said connecting means comprises a pin connecting each of said pistons and a corresponding finger carrier, said synchronizing means including a cross link pivotally mounted on said housing between said opposed track means, a transfer link interconnected between opposed ends of said cross link and a corresponding pin connecting one of said pistons and its corresponding finger carrier.

5. A gripper assembly comprising:

a unitary housing having a cylinder bore extending therethrough, said housing having opposed extensions projecting to one side of said cylinder bore defining a channel, a pair of opposed pistons slidably mounted within said cylinder bore, a closure sealing the opposed ends of said cylinder bore, means for introducing an actuating fluid into said cylinder bore for actuating said piston between a retracted and protracted position, an opposed track member supported on each of said opposed extensions within said channel defining a guideway therebetween, a pair of finger carriers disposed in said guideway between said track members, bearing means interposed between said finger carrier and associated track member for slidably supporting said finger carrier on said track member, means for synchronizing the movement of said finger carrier to the displacement of said pistons, said synchronization means including a cross link pivotally mounted to said housing, a piston pin interconnecting each of said pistons to a corresponding finger carrier, and a transfer link pivotally interconnected between the opposed end of said cross link and a corresponding piston pin whereby the actuation of said pistons effects a corresponding synchronized displacement of said finger carriers longitudinally of said housing between a retracted and protracted position.

6. A gripper assembly as defined in claim 5 wherein each said housing extension is provided with a groove extending longitudinally thereof along the channel defined thereby, each of said finger carriers having a groove extending longitudinally thereof corresponding to and opposed to each of said housing extension grooves, said opposed track members being supported between the corresponding carrier groove and housing extension groove, and said bearing means being disposed between said track member and finger carrier within said carrier groove.

7. A gripper assembly as defined in claim 6 wherein said carrier groove and housing extension groove are provided with angularly disposed faces, said track member having angled surfaces complementing the angularly disposed faces of said grooves whereby said track member is disposed between said carrier groove and corresponding housing extension groove, and said bearing means including a bearing cage having angled sides interposed between said carrier groove and adjacent track member, and a plurality of bearings retained in said cage disposed in rolling engagement with said carrier groove and adjacent track member.

8. A gripper assembly as defined in claim 6 wherein each of said carrier groove and housing extension groove are defined in opposed C-shaped channels, said track member having a rectangular cross-sectional shape, said track member being disposed within said carrier groove and housing extension groove, and said bearing means including a C-shaped cage disposed between said carrier groove and said corresponding track member, bearings retained on each side of said C-shaped cage whereby said bearings being in lateral and vertical bearing relationship with respect to its corresponding track member.

9. A gripper assembly comprising:

a unitary housing having a cylinder bore extending therethrough, said housing having opposed extensions projecting to one side of said cylinder bore to define a channel therebetween, a pair of opposed pistons disposed in said cylinder bore for movement between a retracted and protracted position, end closures for sealing the opposed ends of said cylinder bore, means defining a fluid inlet for introducing fluid into said cylinder bore between said pistons to effect displacement of said pistons to a protracted position, means defining a fluid inlet for introducing fluid into said cylinder bore between a respective end closure and adjacent piston to effect displacement of said piston toward a retracted position, a pair of finger carriers slidably disposed between said opposed housing extensions, means interconnecting each of said finger carriers to a corresponding piston, and the last mentioned said means including a pin for directly connecting said piston to a corresponding finger carrier whereby the displacement of said pistons effects a corresponding movement of said finger carriers between a retracted and protracted position, a synchronization means, said synchronization means comprising a cross link pivotally connected to said housing, a transfer link interconnected between each of the opposed ends of said cross link and said pin interconnecting each of said pistons to its corresponding finger carrier.

10. A gripper assembly as defined in claim 9 including track means supported on each of said housing extensions, a bearing means for slidably supporting said finger carriers between said track means, said bearing means including a cage, and a plurality of bearings retained in said cage disposed in bearing relationship with said finger carriers and associated track means.

11. A gripper assembly comprising:

a unitary housing having a cylinder bore extending therethrough, said housing having opposed extensions projecting to one side of said cylinder bore to define a channel therebetween, a pair of opposed pistons disposed in said cylinder bore for movement between a retracted and protracted position, end closures for sealing the opposed ends of said cylinder bore, means defining a fluid inlet for introducing fluid into said cylinder bore between said pistons to effect displacement of said pistons to a protracted position, means defining a fluid inlet for introducing fluid into said cylinder bore between a respective end closure and adjacent piston to effect displacement of said piston toward a retracted position, a pair of finger carriers slidably disposed between said opposed housing extensions, means interconnecting each of said finger carriers to a corresponding piston, and the last mentioned said means including a pin for directly connecting said piston to a corresponding finger carrier whereby the displacement of said pistons effects a corresponding movement of said finger carriers between a retracted and protracted position, track means supported on each of said housing extensions, a bearing means for slidably supporting said finger carriers between said track means, said bearing means including a cage, and a plurality of bearings retained in said cage disposed in bearing relationship with said finger carriers and associated track means, wherein each of said housing extensions is formed with a longitudinally extending V-shaped groove, each of said finger carriers having an opposed complementary V-shaped groove disposed on opposite sides thereof, an associated track member supported between each of said finger carriers and said housing extensions within said complementary V-shaped grooves, a bearing means disposed between each of said finger carriers and associated track member, said bearing means including a V-shaped cage complementing said finger carrier groove, and a plurality of bearings retained within said cage disposed in rolling engagement with said finger carrier and said associated track member.

12. A gripper assembly comprising:

a unitary housing having a cylinder bore extending therethrough, a pair of pistons slidably disposed within said cylinder bore for movement between a retracted and protracted position, end closures sealing the opposed ends of said cylinder bore, a fluid means for introducing a fluid pressure at a location between said pistons to effect displacement of said pistons to a protracted position, a fluid means for introducing a fluid pressure at a location between the respective end closures and adjacent piston to effect displacement of the piston to a retracted position, said housing including opposed extensions projecting to one side of said cylinder bore to define a channel therebetween, opposed complementary grooves formed in each of said opposed extensions longitudinally thereof, opposed track members received within each of said complementary grooves, a pair of finger carriers disposed between said opposed track members, each of said finger carriers having a carrier groove formed on each side thereof for accommodating said track members whereby said finger carriers are slidably supported between said opposed track members, a bearing means disposed between each of said finger carriers and associated track member within said carrier groove, and means for synchronizing the movement of said finger carriers between the protraction and retraction thereof in response to the displacement of said pistons, said synchronizing means including a pin connecting one of said pistons to a corresponding finger carrier, a cross link pivotally mounted to said housing between said housing extensions, a transfer link pivotally interconnected between the opposed ends of said cross link and the connecting pin of one of said pistons whereby the displacement movement of said pistons is transmitted to said finger carriers for effecting a synchronous movement of said finger carriers between retracted and protracted positions.

* * * * *

UNITED STATES PATENT AND TRADEMARK OFFICE
CERTIFICATE OF CORRECTION

PATENT NO. : 5,529,359

DATED : June 25, 1996

INVENTOR(S) : Nicky Borcea et al

It is certified that error appears in the above-identified patent and that said Letters Patent is hereby corrected as shown below:

On the title page, item [54] and col. 1, lines 1 thru 4, title of the invention

"GRIPPER ASSEMBLY WITH IMPROVED SYNCHRONOUS TRANSMISSION"

Should read:

--CRIPPER ASSEMBLY WITH IMPROVED SYNCHRONOUS TRANSMISSION--.

Signed and Sealed this

Tenth Day of September, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,529,359

DATED : June 25, 1996

INVENTOR(S) : Nicky Borcea et al

It is certified that error appears in the above-identified patent and that said Letters Patent is hereby corrected as shown below:

On the title page, item [54] and col. 1, lines 1 thru 4, title of the invention

"CRIPPER ASSEMBLY WITH IMPROVED SYNCHRONOUS TRANSMISSION"

Should read:

--GRIPPER ASSEMBLY WITH IMPROVED SYNCHRONOUS TRANSMISSION--.

This certificate supersedes Certificate of Correction issued September 10, 1996.

Signed and Sealed this

Twenty-fifth Day of February, 1997

Attest:

BRUCE LEHMAN

*Attesting Officer*  *Commissioner of Patents and Trademarks*